E. LUGO-VIÑA.
AERIAL TRANSPORTATION.
APPLICATION FILED SEPT. 20, 1909.

964,989.

Patented July 19, 1910.
3 SHEETS—SHEET 2.

Witnesses
R. N. Jones

Inventor
Edward Lugo-Viña

By
T. Lloyd Mockabee
Attorney

THE NORRIS PETERS CO., WASHINGTON, D. C.

E. LUGO-VIÑA.
AERIAL TRANSPORTATION.
APPLICATION FILED SEPT. 20, 1909.

964,989.

Patented July 19, 1910.
3 SHEETS—SHEET 3.

Witnesses
R. N. Jones.
H. Jos. Doyle

Inventor
Edward Lugo-Viña

By
T. Lloyd Mockatee Attorney

UNITED STATES PATENT OFFICE.

EDWARD LUGO-VIÑA, OF WASHINGTON, DISTRICT OF COLUMBIA.

AERIAL TRANSPORTATION.

964,989.      Specification of Letters Patent.      Patented July 19, 1910.

Application filed September 20, 1909. Serial No. 518,623.

*To all whom it may concern:*

Be it known that I, EDWARD LUGO-VIÑA, a citizen of the United States, residing at Washington, in the District of Columbia, have invented certain new and useful Improvements in Aerial Transportation, of which the following is a specification.

My invention relates to aerial transportation in which an overhead cable or track is employed having a motor car suspended therefrom, and is an improvement on an application filed by me May 22nd, 1908, Serial No. 434,985, and allowed Aug. 23, 1909.

The principal object of the present invention is to provide means for controlling the motor in order that it may maintain a proper speed in ascending or descending a grade.

With this and other objects in view my invention contemplates the employment of an overhead cable or track on which is mounted a motor having a double grooved ring thereon, means for causing said ring to revolve and an auxiliary cable wound around said ring.

Various changes may be made in the structural arrangements of parts, but a preferred and practical embodiment of the same is shown in the accompanying drawings, in which—

Figure 1:
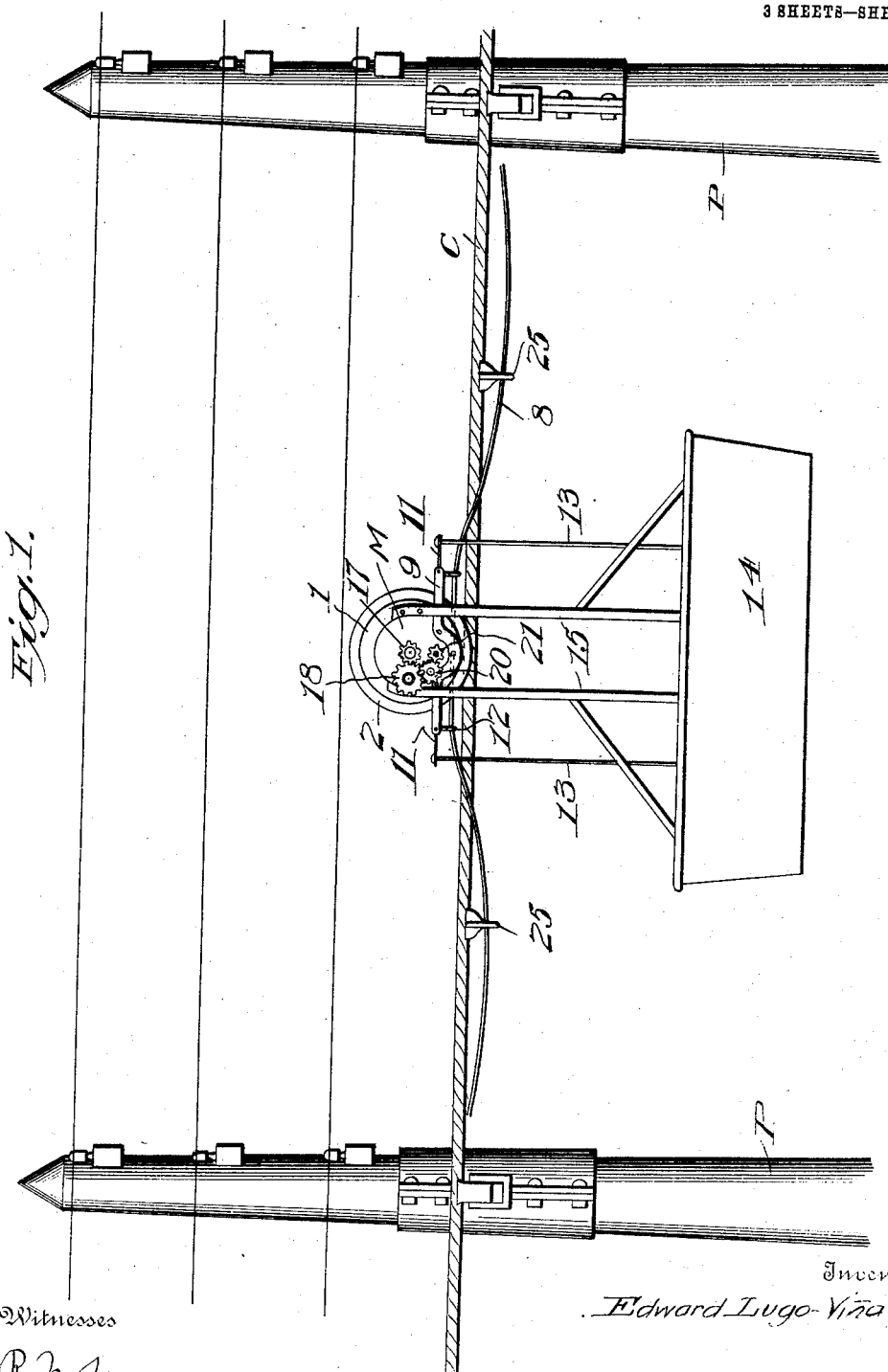
Figure 2:
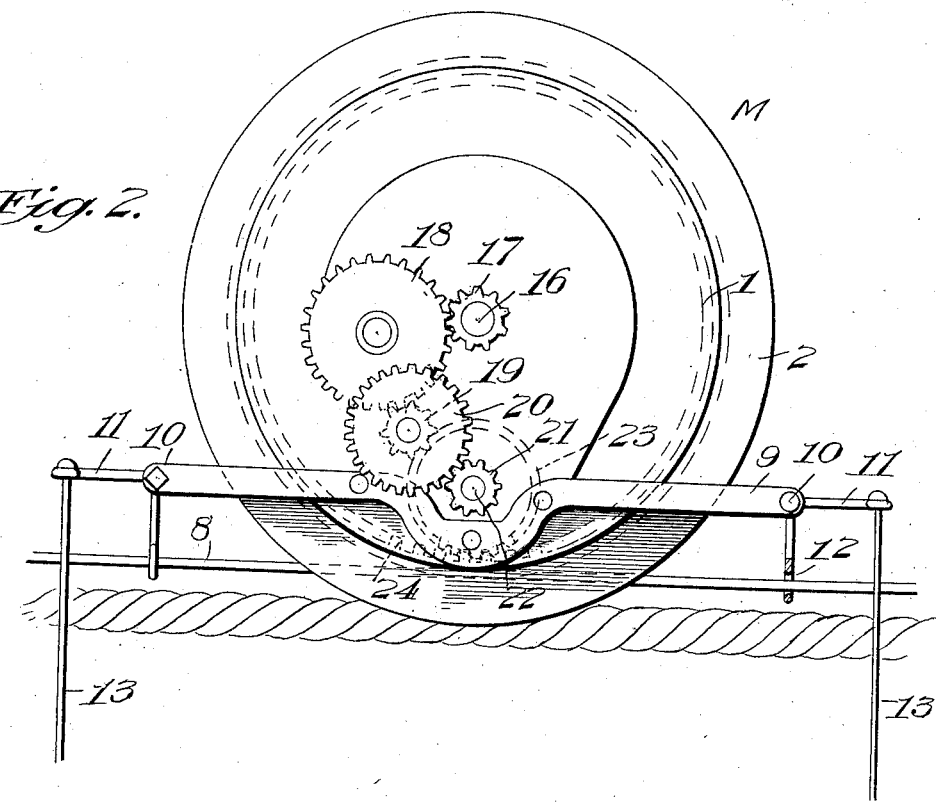
Figure 3:
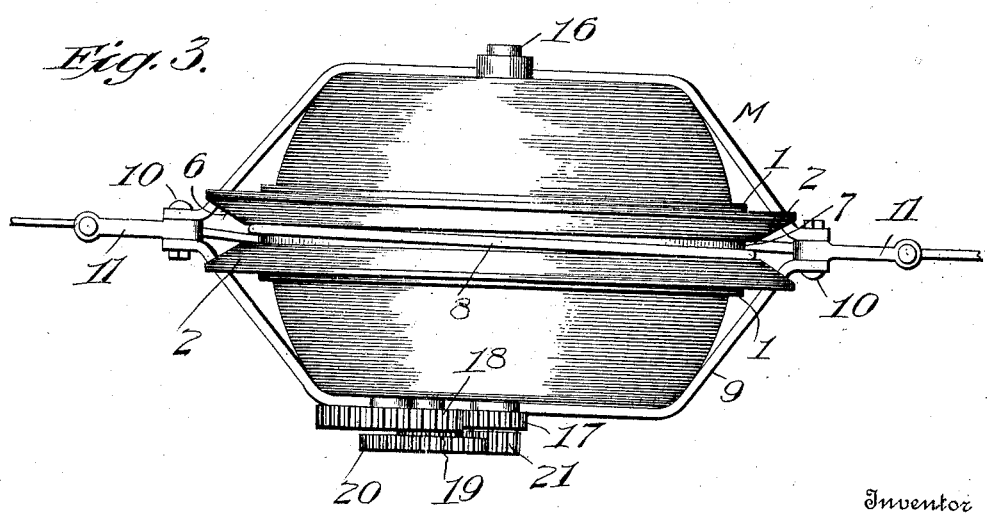
Figure 4:
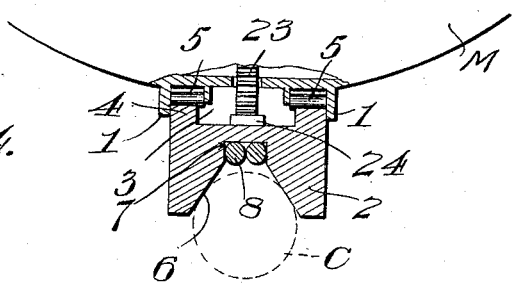
Figure 5:
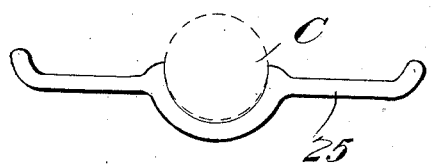
Figure 6:
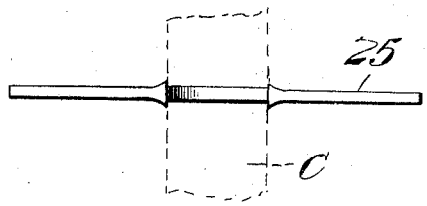

Figure 1 is a side elevation of an overhead supporting cable or track with a motor mounted thereon. Fig. 2 is an enlarged detail side elevation of the motor and contiguous parts. Fig. 3 is a plan view of the subject-matter of Fig. 2. Fig. 4 is a detail sectional view of the wheel applied to the motor and shown mounted on the supporting cable or track, said cable or track being shown in dotted lines. Fig. 5 is a side view of the device for supporting the auxiliary cable and Fig. 6 is a plan view of the same.

Referring to the drawings C designates a cable of proper thickness and construction suspended from ordinary poles P. Any preferred means may be utilized for securing the cable to the poles, such as outstanding bracket arms.

Mounted so as to travel along the cable is a motor M, having formed or secured upon its casing annular flanges 1 which form a channel entirely around the outer circumference of said motor. Revolving within this channel is a ring 2 having a cut out portion 3 on its inner side, said cut out portion forming side flanges 4 adapted to co-act with the flanges 1 of the motor casing and retain said ring in position. Roller bearings 5 are mounted in the channel of the motor casing formed by the flanges 1 and the flanges 4 of the ring 2 are adapted to ride on these bearings, and thereby overcome any friction caused by the revolving ring. A preferably wedge-shaped groove 6 is formed in the outer periphery of the ring 2, said groove running over the cable C and keeping the motor in position thereon. The groove 6 terminates in a substantially rectangular groove 7 and in this groove is adapted to be wound one or more times an auxiliary cable 8. The purpose of this cable is to control the speed of the motor and at the same time furnish means for the movement of the motor on an up grade when otherwise it would be liable to slip. It will be obvious that this cable being fastened at both ends of the line, the revolving action of the ring 2 (by any suitable power) will cause the motor to travel forward or backward over the cable.

In order to provide means for tightening the auxiliary cable around the revolving ring, the motor casing is provided with a frame 9, having pivoted between each of its ends 10, an angle lever 11. The lower arm of this lever has an eye 12 through which the auxiliary cable passes. The other arm of the angle lever is provided with a rope or cable 13 which hangs loosely and within convenient reach of the operator who may be stationed in the car 14, which car is suitably supported by hangers 15 from the motor M. By pulling downward on the rope 13 the lower arm of the angle lever 11 is raised toward the motor M, causing the auxiliary cable to bind more or less upon the ring 2, allowing of a nice adjustment of the tightness of said cable to suit the varying conditions. When the cable 8 is to be removed from or replaced upon the ring 2 it is only necessary to remove the angle levers and slip the cable through the space in the ends of the frame usually occupied by the said levers.

The motor employed may be of any preferred type, such as electric, hydrocarbon, alcohol etc., and while I have shown an electric motor it is evident that any of the ones referred to may be used.

In order to provide means for revolving the ring 2 on the cable C, the motor shaft 16 is provided with a pinion 17, which pinion meshes with a gear 18, said gear in turn meshing with a pinion 19. A gear 20 rotatable with the pinion 19 meshes with a pinion 21 secured to a shaft 22 extending through the motor casing and carrying within said casing a gear 23. This last mentioned gear extends through the lower portion of the motor casing and meshes with an internal gear 24 formed on the inner periphery of the ring 2, as shown clearly in Fig. 4.

Supports 25 comprising laterally extending arms are secured to the cable at suitable intervals to prevent the auxiliary cable from sagging and causing it to tighten and bind around the ring 2.

From the foregoing it is thought that a clear understanding may be had of the construction and operation of the invention and that further description is therefore unnecessary.

I claim:—

1. An aerial transportation system comprising a main overhead cable or track, a motor mounted thereon, a ring rotatably mounted on said motor and provided with a groove for the reception of the main cable and an auxiliary cable wound around said ring.

2. An aerial transportation system comprising a main overhead cable or track, an auxiliary cable, a motor mounted on said cable or track and a ring mounted thereon said ring having a double groove for the reception of the main and auxiliary cables.

3. An aerial transportation system comprising a main overhead cable or track, an auxiliary cable, a motor supported by the main cable, a ring mounted on said main cable and an auxiliary cable wound around said ring.

4. An aerial transportation system comprising an overhead cable or track, a motor mounted thereon, a ring rotatably mounted on said motor and having a double groove formed therein, and an auxiliary cable wound around said ring.

5. An aerial transportation system comprising an overhead cable or track, a motor mounted thereon, a grooved ring mounted on said motor, means for rotating said ring and an auxiliary cable wound around said ring.

6. An aerial transportation system comprising an overhead cable or track, a motor mounted thereon, a double grooved ring mounted on said motor, said ring being provided with an internal gear, means carried by said motor for rotating the grooved ring and an auxiliary cable wound around said ring.

7. An aerial transportation system comprising an overhead cable or track, a motor mounted thereon and provided with a double grooved revolving ring, an auxiliary cable wound around said ring and held stationary at each end and means for causing said auxiliary cable to grip the grooved wheel.

8. An aerial transportation system comprising an overhead cable or track, a motor mounted thereon, a grooved revolving ring mounted on said motor, an auxiliary cable wound around said ring, angle levers carried by said motor said levers being provided with eyes through which the auxiliary cable passes and depending ropes carried by the angle levers.

9. An aerial transportation system comprising an overhead cable or track, a motor mounted thereon, a grooved revolving ring carried by said motor, co-acting flanges formed on said motor and ring, roller bearings carried by the motor and an auxiliary cable wound around said ring.

10. An aerial transportation system comprising an overhead cable or track, a motor mounted thereon, a revolving ring carried by said motor, an auxiliary cable wound around said ring and supports for said cable carried by the overhead cable or track.

11. An aerial transportation system comprising an overhead cable or track, a double grooved ring revolubly mounted on said motor, gearing carried by said motor and meshing with an internal gear on the double grooved ring and an auxiliary cable wound around said ring.

In testimony whereof I affix my signature in presence of two witnesses.

E. LUGO-VIÑA.

Witnesses:
R. N. JONES,
R. C. KEINER.